(12) United States Patent
Aggarwal et al.

(10) Patent No.: US 11,277,464 B2
(45) Date of Patent: *Mar. 15, 2022

(54) DATA RESTORATION FOR DATACENTER FAILOVER

(71) Applicant: Uber Technologies, Inc., San Francisco, CA (US)

(72) Inventors: Nikunj Aggarwal, San Francisco, CA (US); Joshua Corbin, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 16/864,603

(22) Filed: May 1, 2020

(65) Prior Publication Data

US 2020/0259883 A1 Aug. 13, 2020

Related U.S. Application Data

(63) Continuation of application No. 16/136,443, filed on Sep. 20, 2018, now Pat. No. 10,666,705, which is a continuation of application No. 15/255,645, filed on Sep. 2, 2016, now Pat. No. 10,084,845.

(60) Provisional application No. 62/218,058, filed on Sep. 14, 2015.

(51) Int. Cl.
*H04L 29/08* (2006.01)
*H04L 67/02* (2022.01)
*H04L 29/06* (2006.01)
*H04L 69/40* (2022.01)

(52) U.S. Cl.
CPC .......... *H04L 67/02* (2013.01); *H04L 63/0428* (2013.01); *H04L 69/40* (2013.01); *H04L 63/061* (2013.01); *H04L 2463/062* (2013.01)

(58) Field of Classification Search
CPC ..... H04L 67/02; H04L 63/0428; H04L 69/40; H04L 63/061; H04L 2463/062
See application file for complete search history.

(56) References Cited

U.S. PATENT DOCUMENTS

| 6,490,610 B1 * | 12/2002 | Rizvi | G06F 11/2028 |
| | | | 707/999.01 |
| 7,308,502 B2 * | 12/2007 | Rouault | H04L 41/06 |
| | | | 709/229 |
| 8,051,179 B2 * | 11/2011 | Angal | G06F 11/1482 |
| | | | 709/227 |

(Continued)

OTHER PUBLICATIONS

Hoff, T., "How Uber Scales Their Real-Time Market Platform," Sep. 14, 2015, 11 pages, [Online] [Retrieved on Jan. 9, 2020] Retrieved from the Internet <URL: http://highscalability.com/blog/2015/9/14/how-uber-scales-their-real-time-market-platform.html>.

*Primary Examiner* — Jerry B Dennison
(74) *Attorney, Agent, or Firm* — Fenwick & West LLP

(57) ABSTRACT

A failover system can receive active data from user devices running an application specific to a service entity providing an application service. For each user device, the active data can indicate a current status. The failover system can transmit restoration data to the user devices for storage to restore the current status of the user devices in the case of a failover event. When a failover event occurs, the failover system can recover the restoration data from a first user device to restore the current status of the application service for the first user device.

20 Claims, 6 Drawing Sheets

(56) References Cited

U.S. PATENT DOCUMENTS

| | | | | |
|---|---|---|---|---|
| 8,082,351 B1* | 12/2011 | Kelley | .................... | G06F 9/505 |
| | | | | 709/227 |
| 8,949,657 B2 | 2/2015 | McGill et al. | | |
| 9,582,375 B2 | 2/2017 | Bastawala et al. | | |
| 9,817,726 B2* | 11/2017 | Lee | ..................... | G06F 11/1451 |
| 10,084,845 B2* | 9/2018 | Aggarwal | ............... | H04L 69/40 |
| 2007/0208864 A1 | 9/2007 | Flynn et al. | | |
| 2008/0126831 A1* | 5/2008 | Downey | ................ | H04L 69/40 |
| | | | | 714/4.2 |
| 2009/0037998 A1* | 2/2009 | Adhya | ................... | H04L 63/20 |
| | | | | 726/11 |
| 2011/0010560 A1* | 1/2011 | Etchegoyen | ........ | G06F 11/2025 |
| | | | | 713/189 |
| 2011/0047413 A1 | 2/2011 | McGill et al. | | |
| 2011/0179305 A1* | 7/2011 | Lammel | .............. | G06F 11/2048 |
| | | | | 714/4.21 |
| 2012/0113801 A1* | 5/2012 | Robinson | ............ | H04L 12/4633 |
| | | | | 370/221 |
| 2012/0151249 A1* | 6/2012 | Swan | .................... | G06F 11/203 |
| | | | | 714/4.11 |
| 2013/0031403 A1* | 1/2013 | Mordani | ................ | H04L 67/28 |
| | | | | 714/4.11 |
| 2014/0032964 A1* | 1/2014 | Neerincx | ................ | H04L 69/40 |
| | | | | 714/18 |
| 2015/0324259 A1* | 11/2015 | Bastawala | ........... | G06F 11/2046 |
| | | | | 714/4.11 |
| 2017/0134357 A1* | 5/2017 | Ohlsson | ................ | H04L 67/146 |

* cited by examiner

DATA RESTORATION FOR DATACENTER FAILOVER

RELATED APPLICATION

This application is a continuation of U.S. application Ser. No. 16/136,443 filed Sep. 20, 2018 which is a continuation of U.S. application Ser. No. 15/255,645, filed Sep. 2, 2016, now U.S. Pat. No. 10,084,845 which claims the benefit of priority to U.S. Provisional Patent Application Ser. No. 62/218,058, filed on Sep. 14, 2015, each of which is incorporated by reference in its entirety.

BACKGROUND

Failover events for primary datacenters occur periodically for a number of reasons, such as an outage event, program crash, buffer overflow, or other termination of an executing application service. After such failover events, a backup system can automatically switch the application service to a backup datacenter. Backup information, such as redundant transaction log files, can be restored to the backup datacenter in order to resume application services until the failover event is resolved.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
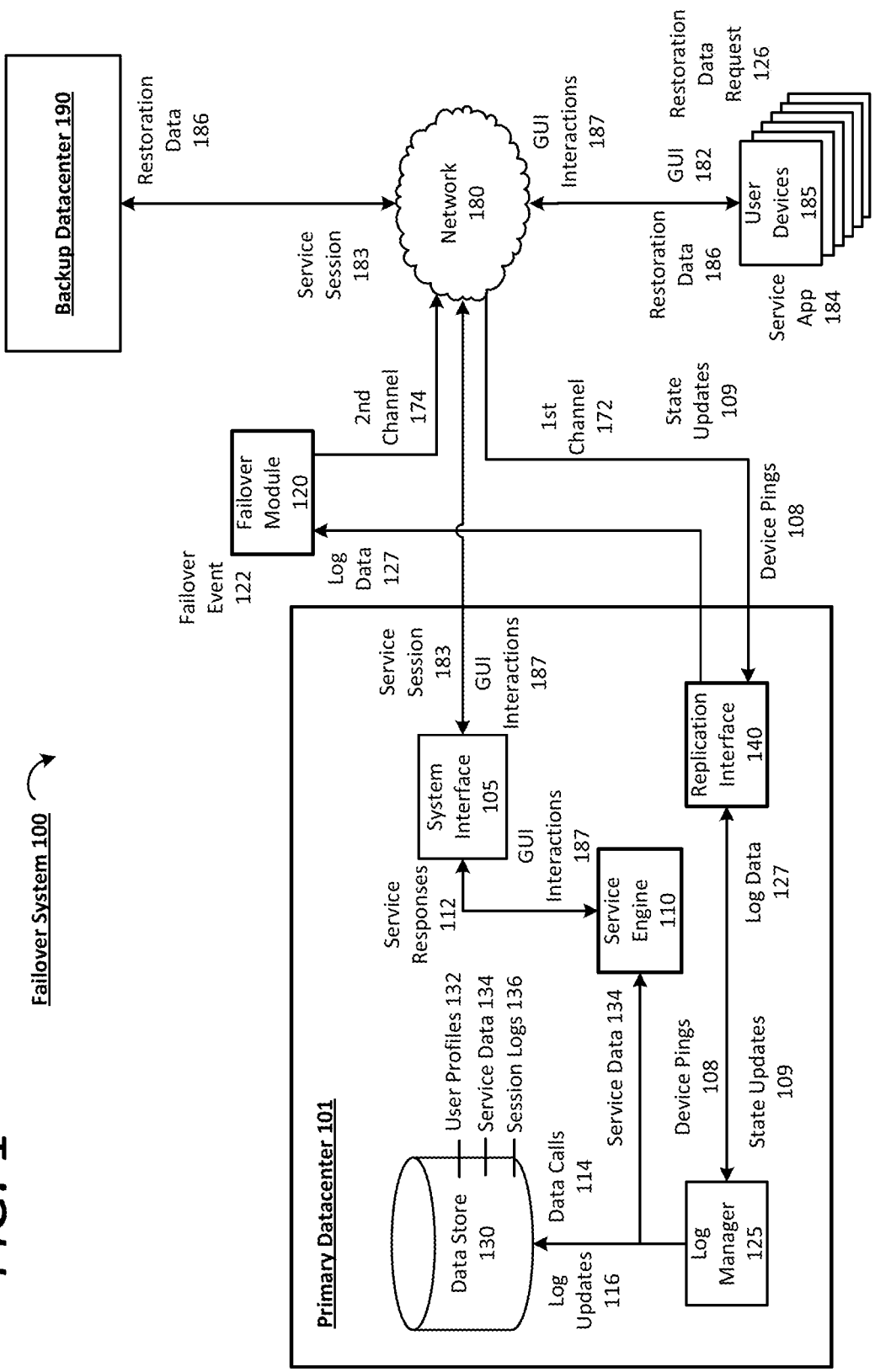
FIG. 1 is a block diagram illustrating an example primary datacenter with a backup datacenter for failover events as described herein.

Failover from primary systems to backup systems enables application service providers to restore the current status of a particular user device (or respective application) when the primary system becomes unavailable, either through failure (e.g., a power failure, overheating, interconnect failure, controller failure, etc.) or manual shutdown (e.g., as a health check mechanism). For application services, failover can result in the loss of crucial data, such as trip data for a navigation service or a transport or delivery arrangement service, or other data requiring a single executing application session. For example, a single data session can comprise live directions on an application for a trip from a starting point to a destination or one or more actions that the user is to perform in the context of a trip (e.g., pick up an item, start a trip, end a trip, etc.). Even with a backup system, a failover event can cause the trip information to be lost, and force the user to re-input the destination in order to start a new data session.

To resolve such deficiencies in failover, a traditional framework involves replicating the trip data dynamically to one or more backup systems, so that in case of a failure of the primary system, a switching element can switch to the backup system to restore the data session. However, when scaling primary application services, backup systems must also be scaled accordingly or multiple backup systems must be utilized, which can quickly lead to cost increases, further failures, and other complications such as buffer overflows, bandwidth overuse, and overall lag in the application service.

To address these deficiencies and complexities, a failover system is provided that can readily restore an active data session in connection with an application service. According to some examples, the failover system can include a real-time replication component that can communicate with user devices to receive active data corresponding to an executing application specific to a service entity (e.g., a social media application, a mapping application, an asset or service sharing application, etc.). For each user device, the active data can indicate a current status for that user device (e.g., a current communication session, a current trip to a destination, etc.). The replication component can include log management functions to identify, based on the received active data, whether log data needs to be refreshed and/or restoration data updated to the user device. The replication component can encrypt and transmit refreshed restoration data for the application service to the user device for temporary storage. The restoration data may be a crucial subset of the active data received, or data specific to restoring the current application status on the user device in the event of a failover.

The failover system can identify a failover event in which an active datacenter, which provides the application service and monitors the current status of the user devices, fails. In response to the failover event, the failover system can recover the restoration data from the user devices to restore their current application statuses on one or more backup datacenters. The failover system described herein may be implemented on any cold datacenter, regardless of any backend replication strategies. Furthermore, the failover system can utilize a simple write-once read-many (WORM) key-value store model, taking advantage of versioning in the keyspace of the restoration data, in order to ease implementation across the various platforms of user devices (i.e., create a non-blocking framework). This not only allows for broad compatibility, but also minimizes bandwidth impact on mobile networks.

In certain implementations, the failover system can implement a dual mode to instigate backend replication for critical state changes (e.g., trip transitions such as beginning a trip, making a pickup, or making a drop-off). The frequency of updates for these critical state changes may be relatively low, which can work well for backend replication on the failover system. However, for other data such as trip points (e.g., GPS coordinate pings for each point on a trip), the update frequency can be relatively high, making replication to multiple datacenters unfeasible. Accordingly, for high-frequency updates, user device-based replication may be implemented by the failover system.

Among other benefits, the examples described herein achieve a technical effect of providing near seamless failover to backup datacenters during active application sessions by utilizing user devices to store restoration data. The examples described herein can overcome the complexities and costs of large-scale data replication amongst various populations of active application users to seamlessly restore active data sessions on any backup system (e.g., a cold datacenter).

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Failover System Description

FIG. 1 is a block diagram illustrating an example failover system, as described herein. The failover system 100 can comprise a primary datacenter 101, a backup datacenter 190, and a failover module 120 to switch the application service from the primary datacenter 101 to the backup datacenter 190 in response to a failover event 122. The failover system 100 can be utilized by any application service that includes continuous communications with user devices 185. For example, the failover system 100 can be utilized by mapping application services that provide mapping directions to a particular destination. As another example, ride sharing services, such as those provided by UBER Technologies, Inc., can utilize driver and/or rider devices to store or cache restoration data 186 to replicate trip data for active trips. In such an example, the failover system 100 can be a part of or be in communication with a transportation or delivery facilitation system. Such application services provide a service application 184 for download on any number of user devices 185. The service application 184 can cause a graphical user interface (GUI) 182, specific to the application service, to be generated on the display screens of the user devices 185.

The users of the user devices 185 may perform GUI interactions 187 with the GUI 182 in order to utilize the application service. The application service can be facilitated by a primary datacenter 101, which can comprise a number of computer systems to execute instructions and run processes in order to implement the application service on the user devices 185 over a network 180. For example, a primary datacenter 101 for mapping service can receive GUI interactions 187 comprising an inputted destination on a user device 185. The primary datacenter 101 can utilize location-based resources (e.g., global positioning system (GPS) resources) of the user device 185 in order to provide dynamic directions to the user device 185 until the destination is reached. The uninterrupted time between initiating the map service and reaching the destination can be a single service session 183 comprising a continuous communication link between the primary datacenter 101 and the user device 185. Accordingly, the primary datacenter 101 can periodically receive location pings from the user device 185 and transmit back GUI data (e.g., a graphic map) showing the live directions to the destination.

The primary datacenter 101 illustrated in FIG. 1 can be utilized by various types of application service entities to provide a corresponding application service (e.g., social media services, communication services, mapping services, asset sharing services, ride sharing services, resource optimization services, financial services, etc.). The primary datacenter 101 can represent an active region for the application service (e.g., a geographical region or a specified population of users). The primary datacenter 101 can further include a service engine 110 to process the GUI interactions 187 performed on the user device 185 running the service application 184. For various application services, the GUI interactions 187 can be received by a system interface 105 of the primary datacenter 101 running the application service. The GUI interactions 187 can then be processed by the service engine 110 to instigate a response. For example, the service engine 110 can interpret the GUI interactions 187 by initiating data calls 114 to a local data store 130 (or external databases) in order to provide relevant data in response.

The data store 130 can include data relevant to the application service, such as user profiles 132, service data 134, and live session logs 136 to maintain refresh data (and flush stale data) during a particular service session 183. According to some implementations, the primary datacenter 101 can further include a log manager 125 for live service sessions 183 to maintain the session logs 136. For example, a distributed key-value data store (e.g., non-relational or NoSQL), such as RIAK developed by BASHO Technologies, can be utilized to maintain and manage session data in connection with an application service.

In many examples, each user device 185 running the service application 184 can periodically transmit a device ping 108 in accordance with a ping protocol, such as a GPS ping every four or five seconds. Additionally or alternatively, the user devices 185 can initiate a communication channel link (e.g., a unidirectional link) to transmit a state update 109 whenever a state of the user device 185 changes in the context of the service application 184. For example, a user device 185 utilizing a mapping service application 184 can transmit a state update 109 when the user device 185 initiates the service application 184, inputs a particular destination, arrives at a destination, terminates the service application 184, etc.

In accordance with certain examples, the service engine 110 can (i) pull service data 134 from the data store 130 in response to specified GUI interactions 187, (ii) process the service data 134 in light of the GUI interactions 187, and (iii) transmit service responses 112 back to the user device 185 accordingly. For example, a primary datacenter 101 servicing a social media application can enable users to generate personal media updates and communicate with other users in real time by processing interactions 187 and outputting service responses 112 to, for example, update a user's profile page or update the GUI 182. State updates 109 and/or device pings 108 from the user device 185 may comprise information indicating a current status of the user device 185, such as one or more other users in active communication with the user device 185, the device location, an operational status of the device 185, and the like.

In various examples, a failover module 120 can comprise replication functionality to cache restoration data in the user devices 185. The failover module 120 can be application specific, or a generic replication module that any particular application service can configure and utilize in order to replicate essential data to restore current statuses of user devices 185 running a corresponding application in the case of a failover event. This real-time replication of essential restoration data can utilize the data transmitted between the user device 185 and the primary datacenter 101 to establish a seamless and reliable backup system, which can be manually triggered at will (e.g., once every hour). Universal unique identifiers (UUIDs) can be generated for each service session 183, and the failover module 120 can keep track of a current "version" of a user's application session state (e.g., via version vectors) on the user device 185. For example, a ride sharing replication system (e.g., failover module 120) can maintain "trip versions" ({tripUUID, version(n)}) on each user device 185 (e.g., every driver device) over each service session 183. Thus, when a user device 185 initiates the service application 184 (i.e., the designated ride sharing application) and accepts a first trip, the failover module 120 can log (or encrypt and then log) {tripUUID, version(1)} to the user device 185, and additional restoration data 186, in order to utilize the user device 185 as an agnostic backup data store.

The failover module 120 may be an independent component of the primary datacenter 101, or may be a part of a switching system that handles switching between the primary datacenter 101 and the backup datacenter 190 during failover events (e.g., a health check module). The use of versioning enables the tracking of data changes in the distributed system (where multiple computer systems can update the data at different times) and in a non-blocking manner. In the example provided, data versions (e.g., service session 183 data or job data) can be updated on the user devices 185, the session logs 136, and the backup datacenter 190 during failover. Accordingly, versioning can enable the failover module 120 to resolve and restore jobs from any type of user device 185 into the backup datacenter 190 by requesting stored keys in the user devices 185—which should be correlated with keysets previously stored in the failed primary datacenter 101.

Additionally or alternatively, the failover system 100 can utilize vector clocks for each of the service sessions 183 or jobs corresponding to each of the user devices 185. Thus, utilizing vectors clocks, the failover system 100 can generate a partial ordering of state or version updates of the user devices 185 over multiple computing systems (i.e., the primary datacenter 101, the user devices 185 themselves, the backup datacenter 190, etc.). Vector clocks can enable the failover system 100 to detect and resolve version conflicts during, for example, failover to the backup datacenter 190 or failback to the primary datacenter 101, as described herein.

For the replication components (i.e., the log manager 125 and failover module 120 in communication with the user devices 185), the communication links with the user device 185 can be unidirectional in order to, for example, provide information security. Accordingly, a first unidirectional communication link 172 from the user device 185 to the primary datacenter 101 can be established whenever a device ping 108 or a state update 109 is transmitted. Furthermore, the first unidirectional communication link 172 can also be established whenever the user device 185 is requested by the primary datacenter 101 to provide updated data, such as refreshed keysets or version updates, as described herein. Conversely, a second unidirectional communication link 174 can be established when the failover module 120 sends a message (e.g., a message comprising restoration data) or data request to the user device 185.

In the example shown, device pings 108 and/or state updates 109 can be transmitted from the user devices 185 to a replication interface 140 of the primary datacenter 101 over the first channel 172, which can submit the driver pings 108 and/or state updates 109 to the log manager 125 to provide updates 116 to the session logs 136 in the local data store 130. The log manager 125 can further provide log data 127 to the failover module 120. In certain implementations, the log manager 125 only provides log data 127 when the application state has changed on the user device 185 (e.g., when a driver has accepted a new trip, a user has terminated the service application 184, etc.). In such implementations, the log manager 125 can first attempt to save the changes through the failover module 120 and on the user devices 185 before providing log updates 16 in the session logs 136. Thus, the failover module 120 can parse or analyze the log data 127, comprising the changes, and transmit the updated restoration data 186 for storage on the user device 185 via the second unidirectional channel 174.

According to examples, the failover module 120 can request operations on the user devices 185 themselves, and forward the requests to the user devices 185 using the second unidirectional channel 174. To receive information from the user devices 185, the primary datacenter 101 can register endpoints with the application program interface (API) of the application service (e.g., the replication interface 140 via the first channel 172). Accordingly, the user device 185, when prompted by the failover module 120, can return any stored data (e.g., via ping protocol), which enables the application service to migrate an active service region between datacenters (either as a normal operation or as a failover) without dropping any ongoing service sessions 183 (e.g., trips), and without any need to copy backend data between datacenters.

Various operational configurations may be required to enable replication across a multitude of platforms. The failover system 100 can utilize a WORM key-value store model, taking advantage of versioning in the keyspace of the restoration data 186, in order to ease implementation across the various platforms of user devices 185. Thus, the data transmitted in the device pings 108 and/or state updates 109 can comprise a number of keysets identifying the current status or state of the user device 185 for a particular service session 183. As discussed herein, in one implementation, device pings 108 may be transmitted in accordance with a ping protocol in which the keysets are transmitted to the replication interface 140 periodically (e.g., every four or five seconds). Additionally or alternatively, an optimized communication protocol may be instigated in which the user device 185 transmits keysets when the state, or current status, of the user device 185 changes.

As an example, a service session 183 may be established for a trip from a start point to a destination using a mapping application. A state change can occur when, for example, a new destination is inputted, the user reaches the destination, the user initiates or terminates the application, etc. Additionally, the user device 185 can establish the first channel link 172 whenever the user device 185 comes back online (e.g., after losing service through a tunnel). Each time the user device 185 establishes the first channel link 172, the user device 185 can transmit a current keyset identifying the current status of the user device 185 (e.g., current trip version, location, connected users, etc.).

In many examples, the restoration data 186 stored on the user devices 185 can be a cached set of key strings that comprises the requisite data for restoring the current status (i.e., the current service session 183) of the user device 185. The set of key strings (i.e., restoration data 186) can further be encrypted in order to provide added security. In such implementations, when the application service is migrated to the backup datacenter 190, the backup datacenter 190 can decrypt the restoration data 186 and resume the service session 183. Furthermore, the set of key strings on the user devices 185 can be inaccessible to the user. As such, the user devices 185 act as agnostic, backup data stores for the primary datacenter 101 in the event of a failover.

At any given time, an error may occur between the communication channels 172, 174 between the user device 185 and the failover module 120. For example, if a transaction fails between the failover module 120 and the user device 185, or between the user device 185 and the replication interface 140, a retry message can be transmitted to the user device 185. Example transaction failures on the user device 185 can include an unknown operation name, an attempt to retrieve a key not stored on the user device 185, mismatched data, a skipped operation, a missing operation (a missing field), or a persistence error while persisting replications to disk. Such error messages may be transmitted by the user device 185 to the replication interface 140, and the failover module 120 can attempt to resolve the error by transmitting, for example, a retry response or internal resolution and ping responses to resolve errors on the user device 185.

A failover event 122 can be detected and/or triggered by the failover module 120 at any given time. Detection of the failover event 122 can occur via a switch element in the failover system 100 and/or by the failover module 120 identifying a version discrepancy between archived keysets and the keysets transmitted in a driver ping 108 or state update 109. For example, after refreshing the keysets in the session logs 136, the log manager 125 can determine whether the user device 185 has any newer versions for a service session 183, or whether a version conflict exists. If there is no version conflict, the log manager 125 can set the newer version (and delete the older version), and the failover module 120 can submit a ping response to store updated restoration data 186 on the user device 185. If, however, there is a version conflict, then the failover module 120 can attempt to resolve the conflict in the next device ping 108 or state update 109, or by transmitting a resolution message to update the restoration data 186 on the user device 185. Thus, in the event of a failover the failover module 120 can request the restoration data 186 for the service session 183 from the user device 185 for transmission to the backup datacenter 190 in order to restore the active service session 183.

In some aspects, the failover module 120 can implement a dual mode to (i) instigate backend replication for critical state changes (e.g., trip transitions such as beginning a trip, making a pickup, or making a drop-off), and (ii) utilize the user devices 185 for other changes, such as device pings 108 to update the user's location. In such aspects, the frequency of the state updates 109, device pings 108, or other state changes can determine whether the failover module 120 utilizes the backup datacenter 190 or the user devices 185 to store the restoration data 186. For example, critical state changes for the user devices 185—such as changes to a user's status (e.g., on-trip, en route to pick-up, drop off made, standby, application launched, application terminated, etc.)—may not occur on a frequent basis compared to device pings 108, which can occur every few seconds. Accordingly, in the dual mode, the failover module 120 can select a backup datacenter 190 to store restoration data 186 that corresponds to the critical state changes (e.g., the state updates 109), and can select the user devices 185 to store restoration data 186 corresponding to the device pings 108.

The failover system 100 can be implemented for any application service that requires continuous, or near continuous, communication with a user device 185 running a service application 184. Failback to the primary datacenter 101 can comprise a cleanup of stale data and the use of the vector clocks described above to transition ongoing sessions or jobs back to the primary datacenter 101.

Example Transportation Facilitation System

Figure 2:
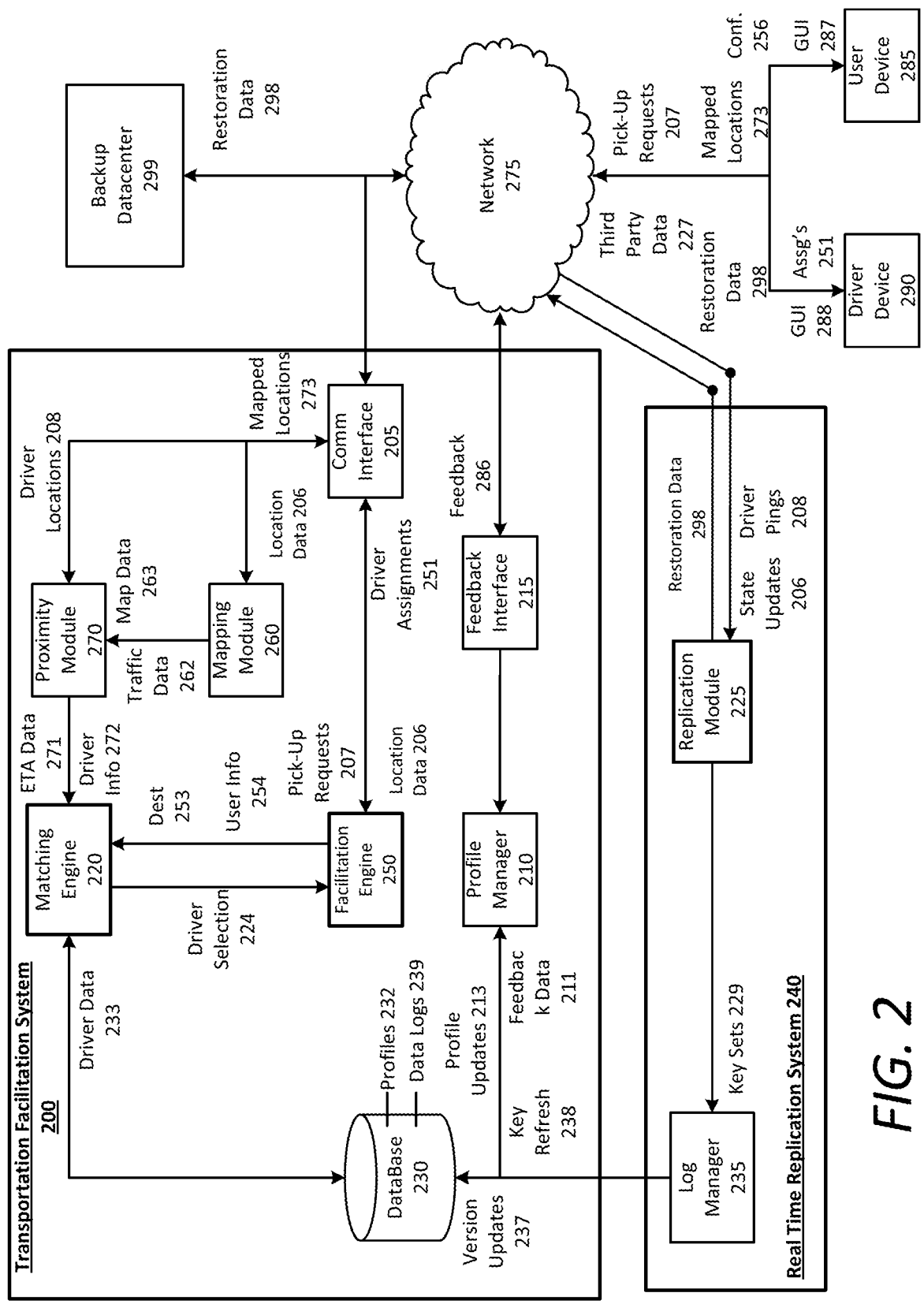
FIG. 2 is a block diagram illustrating an example transportation facilitation system, which can be implemented in connection with the operator tag search system, as described herein.

FIG. 2 is a block diagram illustrating an example transportation facilitation system for matching drivers with requesting users. In the below discussion of FIG. 2, the components and functions of the real time replication system 240 can be representative of one or more components as shown and described with respect to FIG. 1. For example, the real-time replication system 240 shown in FIG. 2 can implement functionality of the failover module 120 and the log manager 125 as shown in FIG. 1. Additionally or alternatively, one or more components and functions of the real time replication system 240 can be implemented as part of the primary data center 101 of FIG. 1, or can be provided as an independent component external to the primary datacenter 101 of FIG. 1. Furthermore, as provided herein, the primary datacenter 101 described in connection with FIG. 1 can facilitate or otherwise host an application service for applications executing on user devices 185. In the discussion with respect to FIG. 2, the application service can comprise a transportation arrangement service managed by a transport facilitation system 200 operating on or as a primary datacenter 101 for a given region (e.g., a metropolitan area).

Referring to FIG. 2, the transportation facilitation system 200 can update a database 230 that can store user and driver data for users and drivers of a network service respectively. The database 230 can include live user and driver data provided by the transportation facilitation system 200 in real time. For example, the database 230 can store updated trip information in a number of dynamic data logs 233, which can be updated periodically. In some implementations, the driver device 290 and/or the user device 285 can send a periodic ping 208 with an updated set of keys corresponding to, for example, a trip version, location information, session time, status, rider information, service information, and the like. In variations, the driver device 290 and/or the user device 285 can initiate a communication session whenever there is a state change on the driver device 290 (e.g., accepting a new trip, initiating or terminating the designated application, updating a waypoint, etc.).

The transportation facilitation system 200 can communicate with a log manager 235 (internal or external to the primary datacenter) to make a number of determinations of whether to refresh 238 logged keys for a particular trip. For example, the log manager 235 can initiate a timer each time the log manager 235 refreshes keys for the trip (with key refresh inputs 238). After a predetermined amount of time (e.g., two minutes), the log manager 235 can refresh 238 the trip keys, and then determine whether a trip version for the driver device 290 needs to be updated. If so, the log manager 235 can instigate version updates 237 in the data logs 239 for the driver device 290, and can delete stale data accordingly (e.g., expired trip version vectors).

As described herein, the transportation facilitation system 200 (and/or the client applications operating on user devices 285 and driver devices 290) can provide a network service or platform in which riders and drivers can be matched for receiving and providing transport services. For example, the transportation facilitation service can be accessible on user devices 285 and driver devices 290 via execution of a designated client application, which can generate a graphical user interface (GUI) 287 specific to the user device 285, and a GUI 288 specific to the driver device 290 (e.g., a rider application or a driver application, respectively). When a driver is selected to service a particular pick-up request 207, the transportation facilitation system 200 can generate and transmit an invitation to selected driver's computing device (running the driver application) to service the pick-up request 207.

Over time, as users and drivers receive and provide transport services, respectively, historical data about such completed transport services can be gathered/stored indicating relevant information concerning respective users and drivers. For example, when a given transport service (e.g., also referred to herein as a trip) is completed, the rider application can provide a GUI 287 that enables the user or rider of that trip to provide feedback 286 for the driver. The user can provide input via the user device 285 to submit feedback information to the network service. In one example, the transportation facilitation system 200 can include a feedback interface 215 to receive feedback information (e.g., feedback 286) from rider applications that indicate the respective user's overall experience for any given completed trip.

A profile manager 210 of the transportation facilitation system 200 can use such feedback data 211 to manage the various user profiles 232 for drivers and/or rider stored in the database 230. For example, for each completed trip, the profile manager 210 can associate the feedback data 211 with a driver profile 234 of the driver that provided a trip for the user, and/or associate the feedback data 211 to a record associated with the completed trip (e.g., a trip record) stored in the database 230. The profile manager 210 can also extrapolate or determine, for individual users, preference information using collected feedback data 211. As described herein, a trip record can include information associated with the transport service, such as the user information or identifier (ID), the driver information or ID, a start time and start location of the trip, an end time and end location of the trip, a vehicle type taken by the user, the route traveled, the price or fare for the trip, the feedback data 211 of the driver (given by the user), the feedback data of the user (given by the driver), trip count, etc. In this manner, for a given user, the transportation facilitation system 200 can store historical data about trips that the user has taken as well as the driver ratings (e.g., two stars out of five stars, or five stars out of five stars, etc.) that that user gave to the individual drivers that provided those trips.

Additionally or alternatively, the transportation facilitation system 200 can store and update records for one or more fleets of autonomous vehicles (AVs) that can be utilized to service pick-up requests 207. For each AV, the records can include live location information, service records, vehicle type, vehicle features, vehicle status (e.g., in use or available), home location, remaining fuel or power, a trip count and/or summary, an AV user rating, available services (e.g., Internet connectivity, user interface features, entertainment features, etc.), and the like. The log manager 235 of the transportation facilitation system 200 can update the AV records for any number of events, or type of events. Furthermore, each AV can provide state updates 206 or AV pings (e.g., like the driver pings 208) in order to enable the log manager 235 to perform key refresh actions 238 and version updates 237 for AV logs. In certain examples, each AV may include an AV profile in the database 230 that comprises AV data that may be dynamically updated, and restoration data 298 may be transmitted back to the AV's onboard computing system for storage in case of a failover event, as described above with respect to FIG. 1. Accordingly, the AV computer can be considered a user device (e.g., user device 185) in the context of storing backup data as described with respect to FIG. 1.

The transportation facilitation system 200 can include a transportation facilitation engine 250, which can provide driver assignments 251 to service individual pick-up requests 207 based on a variety of factors. The transportation facilitation system 200 may include a communication interface 205 for communication with user devices 285 and driver devices 290. A user that wishes to submit a pick-up request 207 can launch the designated application on the user's device 285 (e.g., a smartphone, a tablet computer, a wearable computing device, a personal computer, etc.), which can generate a GUI 287 specific to the transport service. Using the GUI 287, the user can send a pick-up request 207 indicating a pick-up location and/or a destination (as well as a vehicle type). The pick-up location can correspond to a current location of the user device 285 (by using geo-aware or location-based resources of the user device 285) or a specified location inputted by the user. The communication interface 205 can provide the pick-up request 207 to the facilitation engine 250, which can submit the requesting user's information 254 (e.g., the user's name, a unique identifier, or some other identifying criteria of the user) to a matching engine 220 of the transportation facilitation system 200.

Upon receiving the pick-up request 207, the facilitation engine 250 may also receive location data 206 of the requesting user. The location data 206 may be received via location-based resources of the user device 285, or may be received as a part of the pick-up request 207. The location data 206 may further be transferred to a mapping module 260 of the transportation facilitation system 200. Upon launching the designated application, or upon receiving the pick-up request 207, a proximity module 270 of the transportation facilitation system 200 can identify the driver locations 208 of all available (or unavailable) proximate drivers in relation to the requesting user. In one example, a driver tracking component (e.g., not shown in FIG. 2 for purpose of simplicity) can periodically receive location information (e.g., the driver locations 208) corresponding to the current location of the driver from the driver devices 290 and provide the location information to the proximity module 270 and/or can store the location information in the database 230 that is accessible by the proximity module 270. The mapping module 260 can provide the location of the requesting user and provide map data 263 of a geographic region that includes or corresponds to the pick-up location to the proximity module 270. Additionally, the mapping module 260 may further provide traffic data 262 to the proximity module 270 identifying traffic conditions near the requesting user. While the mapping module 260 of FIG. 2 is shown as a component of the transportation facilitation system 200, other arrangements are contemplated in which the mapping data 263 and traffic data 262 are provided by an external mapping resource over the network 275.

In the example shown in FIG. 2, the communication interface 205 is shown as a separate component to receive the location data 206 from the user device 285 and the driver device 290. However, transmissions between the transportation facilitation system 200/real-time replication system 240 (for failover data communications) and the user and driver devices 285, 290 may be made through a single (or a single set) of communication interface(s) of the transportation facilitation system 200. Furthermore, the functions of the transportation facilitation system 200 are shown in FIG. 2 as being performed by a single system 200 (e.g., a primary datacenter). However, in accordance with examples described herein, the real time replication system 240 (e.g., the failover module 120 shown in FIG. 1) enables migration of the functions of the system 200 to any datacenter (e.g., a backup datacenter 299) using the restoration data 298 replicated on the driver device 290 (and/or user device 285).

Thus, the location data 206 may be received by the transportation facilitation system 200 via the pings 208 from the driver devices 290 or the user devices 285. These pings 208 can enable the log manager 235 to update the real-time locations of drivers and users in the data logs 239, which can be accessed by the matching engine 220, or other service engine, to update the GUIs 287, 288 on the user device 285 and driver device 290 accordingly.

As an addition or alternative to the above-discussed functions, the proximity module 270 can utilize the map data 263, including the pick-up location and the driver locations 208 to identify the proximate drivers in relation to the requesting user (or the user's specified pick-up location). In some implementations, the proximity module 270 can provide the mapped locations 273 to the user's device 285—where the mapped locations 273 can include a map comprising the real-time relative locations of proximate drivers in relation to the user's current location, or in relation to a pinned pick-up location configured by the requesting user on the GUI 287.

The proximity module 270 can determine which drivers are within a predetermined distance of the pick-up location (e.g., within four miles) and/or are within an estimated time of travel from the pick-up location (e.g., within six minutes). For example, the proximity module 270 can utilize the driver locations 208, the map data 263, and/or the traffic data 262 to determine an estimated time of arrival (ETA) 271 for each of the proximate drivers to the user's location. As described below, the ETA data 271 for each proximate driver can be utilized by the matching engine 220 as one of a number of optimization factors to ultimately select an optimal driver to service the pick-up request 207.

As provided herein, the matching engine 220 can receive the user information 254 of the requesting user from the facilitation engine 250. The matching engine 220 can further receive driver information 272 for the proximate drivers identified by the proximity module 270. According to examples described herein, the matching engine 220 can utilize the user information 254 from the pick-up request 207 and the driver information 272 to perform a lookup of driver data 233 in the database 230, for example, in the driver and user profiles 232. Based on the information in the profiles 232, the matching engine 220 can make a driver selection 224, from the proximate drivers, to service the received pick-up request 207. Additionally, the matching engine 220 can utilize further information, external to the information provided in the database 230. For example, the matching engine 220 can utilize the ETA data 271 generated by the proximity module 270. Additionally or alternatively, the matching engine 220 can utilize the destination 253 indicated by the user. Further information, such as environmental factors, pricing conditions, traffic conditions, etc., may also be considered by the matching engine 220.

In accordance with examples described herein, the facilitation engine 250 can receive a pick-up request 207 from a respective user device 285 and transmit identifying user info 254 and the selected destination 253 to the matching engine 220. Furthermore, the proximity module 270 can identify proximate drivers in relation to the requesting user and calculate or estimate an ETA 271 for each of the proximate drivers. The matching engine 220 can utilize identification information for both the requesting user and the proximate drivers to pull the requesting user's profile and the proximate drivers' profiles (e.g., profiles 232) in the database 230 to perform a matching operation. After making a driver selection 224 of an optimal driver from the proximate drivers, the matching engine 220 can submit this driver selection 224 to the facilitation engine 250, which can transmit a driver assignment 251 or invitation to the selected optimal driver based on the matching operation. Once the selected driver accepts the assignment 251, e.g., by providing input on the driver application, the facilitation engine 250 can submit a confirmation 256 to the requesting user's device 285 indicating that the optimal driver has been selected for the user and is en route to service the user's pick-up request 207.

In various examples, each driver device 290 running the designated application can periodically transmit a driver ping 208 or a state update 206 comprising keysets 229 indicating a current status of the driver device 290. For example, when a driver receives and accepts a driver assignment 251 to service a particular pick-up request 207, the driver device 290 can initiate a communication session with the real-time replication system 240 to provide the state update 206 comprising a keyset 229 indicating a new trip version. The replication module 225 of the real-time replication system 240 can determine whether the keysets stored in the data logs 239 for the driver device 290 requires a key refresh 238 (e.g., if a predetermined amount of time has lapsed). If so, the replication module 225 can forward the keyset 229 to the log manager 235 to instigate a key refresh 238 in the data logs 239.

Additionally, the replication module 225 can determine whether the current trip version indicated in the state update 206 conflicts with the current version indicated in the data log 239. If there is no conflict, the replication module 225 can forward the keyset 229 to the log manager 235 to set the new trip version and transmit a message to the driver device 290 to cache the refreshed restoration data 298. If there is a conflict, then the replication module 225 can identify that a state divergence between the driver device 290 and the transportation facilitation system 200 has occurred. In one case, the driver device 290 may have an older trip version cached as a portion of the restoration data 298, which can be updated directly by the replication module 225. In another case, the driver device 290 may have a concurrent trip version cached as a portion of the restoration data 298, which can be handled by a conflict resolver of the transportation facilitation system 200 (e.g., the log manager 235). In yet another case, the driver device 290 may have a newer trip version stored as a portion of the cached restoration data 298, which can be readily restored in the next state update 206 or driver ping 208.

In various examples, the above data described in connection with the transportation facilitation system 200 can be stored in the database system 230. The database system 230 can include permanent or temporary storage frameworks that enable the log manager 235 to provide live updates to dynamic data for user devices 285 and/or driver devices 290 (e.g., live location data), user and driver profiles, trip counts or versions, acceptance rates, etc. For example, the log manager 235 of the transportation facilitation system 200 can manage a number of live data logs 239 in the database system 230 which can include live data corresponding to the transportation facilitation service. This live data can include indications of whether the designated application has been activated on a particular user device 285 or driver device 290, the current location of a particular user or driver (e.g., coordinate data), a live ratings indicator for a particular driver, a trip count indicator, various time and location stamps corresponding to pick-ups and drop-offs, correlation information between time and location stamps and other live data, vehicle data, a live status indicator (e.g., whether the driver is available, en-route, currently servicing a pick-up request 207, etc.), live acceptance rates, service area data, home locations, service type data, and the like.

In many examples described herein, for each respective driver device 290, the log manager 235 can maintain a live log containing a set of keys comprising dynamic information for that driver device 290. The set of keys can be refreshed by the log manager 235 in accordance with a timer in order to update the driver log (e.g., once every 2 minutes) and flush stale data (e.g., whenever a new trip version is identified from a received key set 229). In many examples, the log manager 235 can be coupled to the replication module 225, which can receive the driver pings 208 and/or state updates 206 from the driver devices 290. As described above, these pings 208 or updates 206 can comprise keysets 229 that include information regarding trip status and/or version, location, rider(s), a time stamp, and the like. The log manager 235 can determine (e.g., via a comparison between a logged time and the timestamp) whether a logged keyset should be refreshed 238. If so, the log manager 235 can instigate a key refresh 238 in the data log 239 and then determine, from the refreshed keyset, whether a version or state update has occurred.

If the versions indicated in the refreshed keys match the current versions in the data logs 239, the log manager 235 can await further keysets 229 and/or the replication module 225 can resolve the driver ping 208 or state update 206 (e.g., by transmitting a ping response back to the driver device 290). Along these lines, before or after every key refresh 238, a determination may be made by the replication module 225 whether the version data in the data logs 239, and hence the restoration data 298 on the driver devices 290, are stale. If the restoration data 298 is still fresh, then the log manager 235 and the replication module 225 can stand by for the next driver ping 208 or state update 206.

However, if the versions indicated in the refreshed keys do not match the current versions in the data logs 239, the log manager 235 can update the stored versions in the data logs 229 directly, or transmit a request to the driver device 290 to return a replication data packet in order to update the data logs 239 with the version updates 237. Further, the log manager 235 can select the refreshed restoration data 298 to be stored on the driver device 290. The refreshed restoration data 298, to be utilized by the backup datacenter 299 in the event of a failover, can be encrypted by the replication module 225, and transmitted to the driver device 290 for temporary storage.

In the event of a failover, the restoration data 298 can be requested from the driver device 290, decrypted, and utilized by the backup datacenter 299 to restore the state of the driver device 290 (and the user device 285). For example, when a failover event occurs, a data request may be transmitted to the driver device 290 for the restoration data 298, which can be submitted to the backup datacenter 299. If the failover event occurs while the driver is currently servicing a pick-up request 207 (e.g., when the driver is en route to a destination 253), the backup datacenter 299 can process the restoration data 298 and restore the lost trip in near real time.

Methodology

Figure 3:
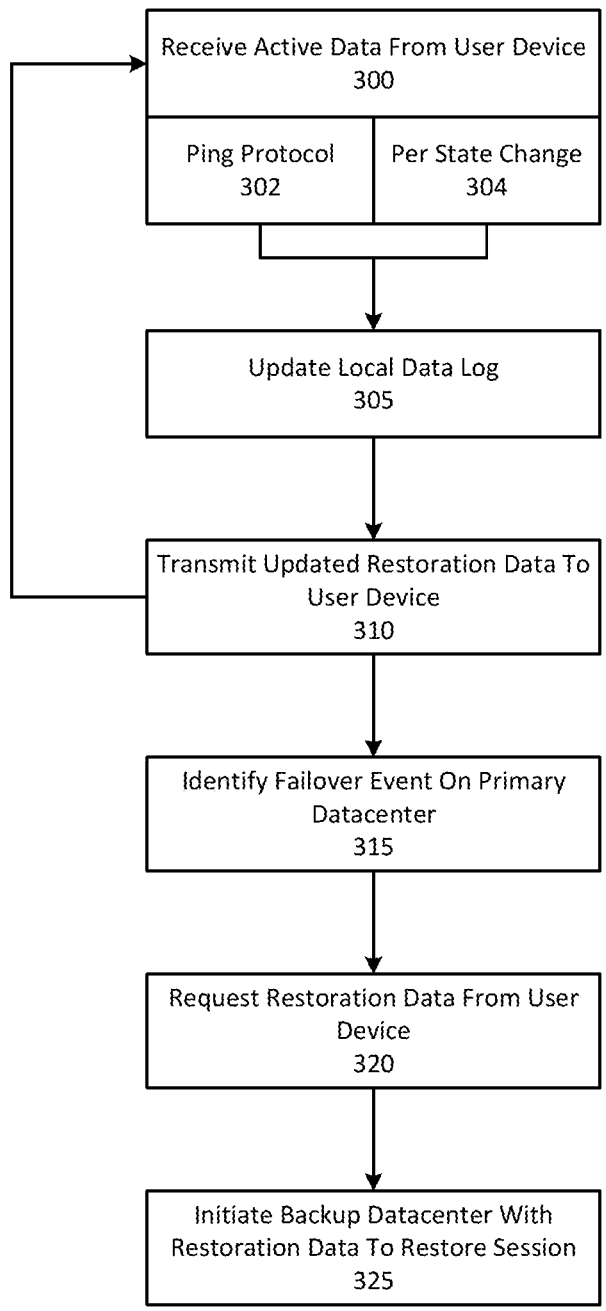
FIG. 3 is a flow chart describing an example method of restoring service activity in response to a failover event, as described herein.

FIG. 3 is a flow chart describing an example high level method of restoring service activity in response to a failover event, as described herein. In the below description of FIG. 3, reference may be made to like reference characters representing various features of FIGS. 1 and 2 for illustrative purposes. Furthermore, the method described in connection with FIG. 3 may be performed by an example failover system 100 as described with respect to FIG. 1, or a real-time replication system 240, as described with respect to FIG. 2 (each referred to herein as a "failover system 100"). Referring to FIG. 3, the failover system 100 can receive active data from a user device (300). As described above, the active data may be data received in connection with a continuous, or near continuous, communication link between a backend system (e.g., a primary datacenter 101) and the user device 185.

The active data can be received in accordance with a normal ping protocol (302), or based on state changes occurring on the user device (304). The failover system 100 can update a local data log on the primary datacenter 101 (or forward the keyset to the primary datacenter 101 for updating) (305). Furthermore, the failover system can pull restoration data from the active data and transmit the updated restoration data 186 to the user device for temporary storage (310). The process can repeat each time active data, such as a state update 109 or a device ping 108 is received.

At any given time, the failover system 100 can identify a failover event on the primary datacenter 101 (315). In response to detecting the failover event, the failover system 100 can recover the restoration data 186 from the user device 185 (e.g., by requesting or pulling the data 186) in order to initiate the backup datacenter 190 (320). Thereafter, the backup datacenter 190 can utilize or execute the restoration data to restore the service session 183 of the user device 185 (325).

Figure 4:
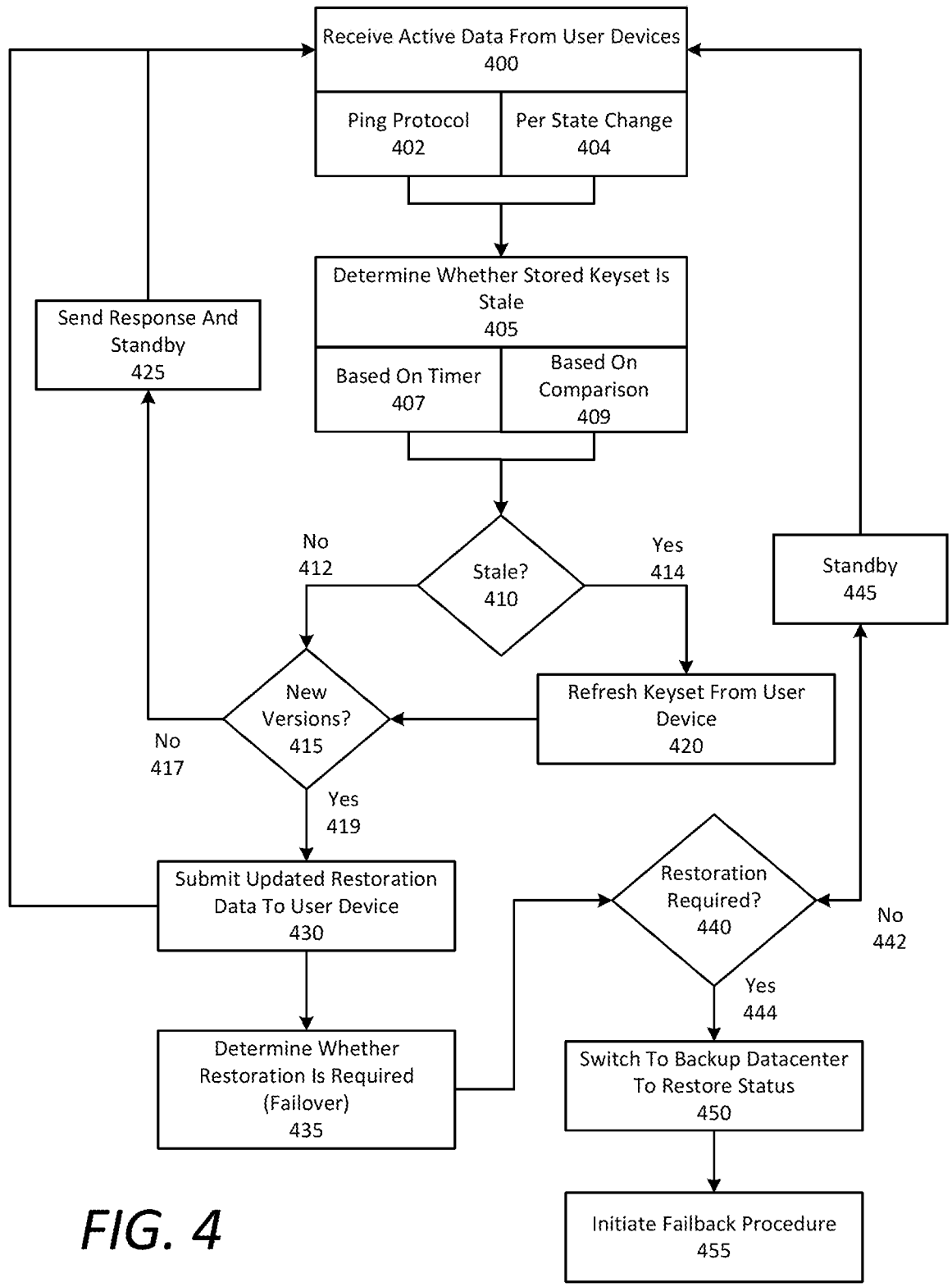
FIG. 4 is a low level flow chart describing an example method of updating restoration data and initiating a backup datacenter, as described herein.

FIG. 4 is a flow chart describing an example low level method of updating restoration data and initiating a backup datacenter, as described herein. In the below description of FIG. 4, reference may be made to like reference characters representing various features of FIGS. 1 and 2 for illustrative purposes. Furthermore, the low level method described in connection with FIG. 4 may be performed by an example failover system 100 described with respect to FIG. 1, or a real-time replication system 240 as described with respect to FIG. 2. Referring to FIG. 4, the failover system 100 can receive active data from a user device (400). As described above, the active data may be data received in connection with a continuous, or near continuous, communication link between a backend system (e.g., a primary datacenter) and the user device 185.

As described above, the active data can be received in accordance with a normal ping protocol (402), or based on state changes occurring on the user device (404). The failover system can then determine whether a stored keyset for the user device is stale (405). For example, each received active data packet can comprise a current keyset and cause the failover system to initiate a timer in order to trigger a refresh after a predetermined period of time. Thus, the failover system can refresh the stored keyset for the user device based on the timer (407). Alternatively, the failover system can refresh the stored keyset based on a comparison (e.g., a version comparison) between the stored keyset and the received active data (409). Additionally or alternatively, the failover system can automatically refresh the keyset stored locally each time a new active data packet is received.

In decision block (410), the failover system determines whether the locally stored keyset is stale. If the keyset is stale (414), the failover system can refresh the local keyset with the receive keyset and delete the stale data (420). The failover system can then determine whether any key strings in the keyset indicate new versions (415). However, if the failover system determines that the locally stored keyset is not stale (412), the process can then move to decision block (415) to determine whether any new versions are indicated in the received active data. Alternatively, once the active data is received, the failover system can automatically determine whether any new versions are indicated in the received keyset (415).

If there are no new versions in the received keyset comprising the active data (417), the failover system can submit a response (e.g., a ping response) back to the user device 185 and stand by for further active data (425). If, however, the failover system identifies new versions in the received keyset (419), the failover system can submit the updated versions, or updated restoration data 186 to the user device 185 for temporary storage (430). The process can thereafter repeat every time a new active data packet (e.g., a state update) is received from the user device 185.

At any given time, the failover system can determine whether restoration of a service session is required (e.g., detection of a failover event) (435). This determination may be made by, for example, the failover module 120 as shown in FIG. 1. Alternatively, a failover signal may be received from a server switching element or an engine tier node due to an inability to access or write to the primary datacenter 101, or a failure to respond to a periodic heartbeat message to the primary datacenter 101. In any case, the failover system can, at decision block (440) determine whether restoration of an active region is required. As discussed herein, an active region may be a geographic region or a population of users handled by a primary datacenter 101.

If restoration is not required (442), then the failover system can simply standby (445), and the process can continue or repeat accordingly. If a failover has been identified (444), then the failover system can recover the current restoration data 186 from the user devices 185 of the active region, and switch the application service to the backup datacenter 190 (450). Accordingly, the active service sessions 183 can be seamlessly restored by the backup datacenter 190, and the failover system can initiate a failback procedure to failback the application service to the primary datacenter (455).

Hardware Diagrams

Figure 5:
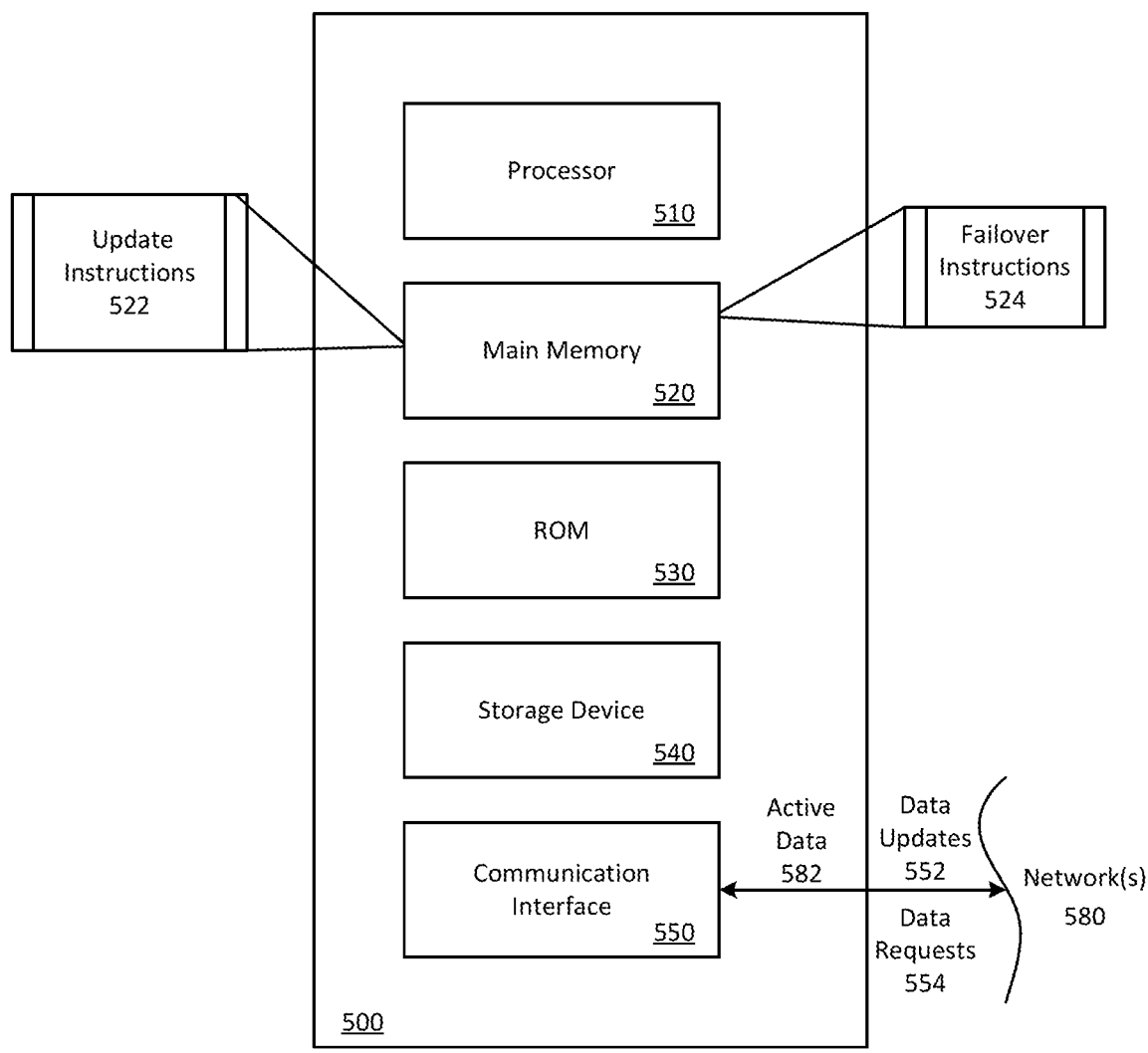
FIG. 5 is a block diagram illustrating an example computing system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a failover service executed over one or more networks. In the context of FIG. 1, the failover system 100 may be implemented using a computer system such as described by FIG. 5. The failover system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, and one or more servers. In accordance with examples, the computer system 500 receives active data 582 from computing devices of users. The executable instructions stored in the memory 530 can include update instructions 522, which the processor 510 executes to update keysets locally and on user devices. The executable instructions stored in the memory 520 can also include failover instructions 524, which enable the computer system 500 to transmit restoration data requests 554 to the user device to submit restoration data to a backup datacenter in the event of a failover, as described herein. By way of example, the instructions and data stored in the memory 520 can be executed by the processor 510 to implement an example failover system 100 of FIG. 1. In performing the operations, the processor 510 can receive active data 582, and transmit data updates 552 and data requests 554 via the communication interface 550.

The processor 510 is configured with software and/or other logic to perform one or more processes, steps and other functions described with implementations, such as described by FIGS. 1 through 4, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
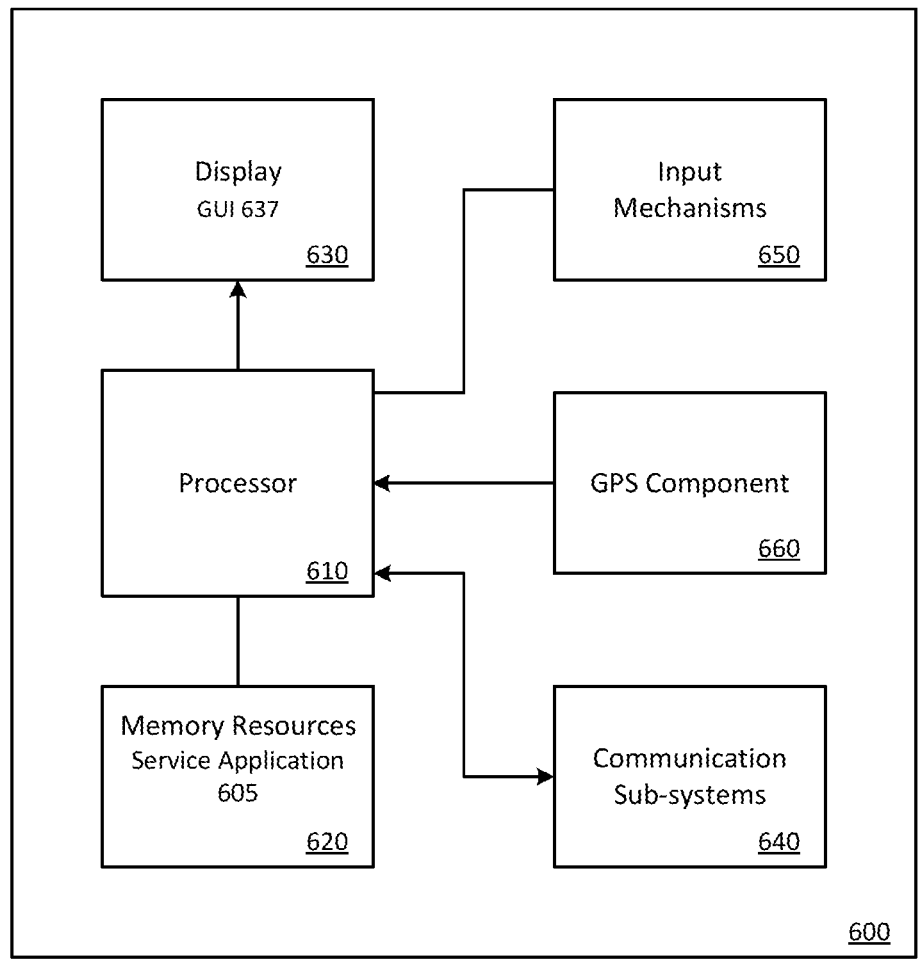
FIG. 6 is a block diagram illustrating an example computing device upon which examples described herein may be implemented.

FIG. 6 is a block diagram that illustrates a computing device upon which examples described herein may be implemented. In one example, a computing device 600 may correspond to, for example, a cellular communication device (e.g., feature phone, smartphone etc.) that is capable of telephony, messaging, and/or data services. In variations, the computing device 600 can correspond to, for example, a personal computer (PC), a tablet computer, or wearable computing device. Still further, the computing device 600 can be distributed amongst multiple users of a search system 100 as described herein.

In an example of FIG. 6, the computing device 600 includes a processor 610, memory resources 620, a display device 630 (e.g., such as a touch-sensitive display device), one or more communication sub-systems 640 (including wireless communication sub-systems), input mechanisms 650 (e.g., a virtual or analog keyboard), and/or one or more location detection mechanisms (e.g., GPS component) 660. In one example, at least one of the communication sub-systems 640 sends and receives data over data channels and/or voice channels.

A user can operate the computing device 600 to enable or connect with the primary datacenter 101 running an application service. The memory resources 620 can store a service application 605 which can be executed by the processor 610 to cause an application GUI 637 to be generated on the display 630. User interaction with the application GUI 637 can enable the user to utilize application services, which enables the primary datacenter 101 to return service updates and responses on the application GUI 637.

While examples of FIG. 5 and FIG. 6 provide for a computer system 500 and computing device 600 for implementing aspects described, in some variations, the computing device 600 can operate to implement some or all of the functionality described with the failover system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A method for restoring data in an active data center, the method performed by at least one processor of a user device and comprising:
    transmitting, by the user device that is executing an application associated with a service entity that provides an application service using the active datacenter, active data to a failover system, the active data including a first portion associated with a service state change of the user device, and a second portion associated with a device ping of the user device;
    receiving restoration data from the failover system, the restoration data associated with the second portion of the active data;
    storing the restoration data at the user device;
    receiving, by the user device, a request from the failover system for the restoration data due to a failover event indicating a failure of the active datacenter; and
    transmitting, by the user device, the restoration data to the failover system based on the request, wherein the restoration data is stored in a backup datacenter of the active datacenter.

2. The method of claim 1, wherein the application service facilitates transportation services between riders and drivers, and the service state change includes a trip transition.

3. The method of claim 2, wherein a trip transition includes beginning a trip, making a pickup, or making a drop-off.

4. The method of claim 1, wherein the device ping indicates a location of the user device.

5. The method of claim 2, wherein the user device is a driver device executing the application specific to the application service that facilitates the transportation services.

6. The method of claim 1, wherein the restoration data comprises a set of encrypted keys, the set of encrypted keys corresponding to a set of encrypted keys previously stored by the failed active datacenter.

7. The method of claim 1, wherein the user device transmits the active data to the failover system each time the user device reconnects with the active datacenter, and each time the user device updates its status.

8. The method of claim 7, wherein the status of the user device comprises at least one of accepting a new pick-up request, completing a current trip, updating a waypoint, initiating the application, or terminating the application.

9. A non-transitory computer-readable storage medium storing instructions, that when executed by one or more processors of a user device, cause the user device to:
    transmit, by the user device that is executing an application associated with a service entity that provides an application service using the active datacenter, active data to a failover system, the active data including a first portion associated with a service state change of the user device, and a second portion associated with a device ping of the user device;

receive restoration data from the failover system, the restoration data associated with the second portion of the active data;

store the restoration data at the user device;

receive, by the user device, a request from the failover system for the restoration data due to a failover event indicating a failure of the active datacenter; and transmit, by the user device, the restoration data to the failover system based on the request, wherein the restoration data is stored in a backup datacenter of the active datacenter.

10. The non-transitory computer-readable storage medium of claim 9, wherein the application service facilitates transportation services between riders and drivers, and the service state change includes a trip transition.

11. The non-transitory computer-readable storage medium of claim 10, wherein a trip transition includes beginning a trip, making a pickup, or making a drop-off.

12. The non-transitory computer-readable storage medium of claim 9, wherein the device ping indicates a location of the user device.

13. The non-transitory computer-readable storage medium of claim 10, wherein the user device is a driver device executing the application specific to the application service that facilitates the transportation services.

14. The method of claim 9, wherein the restoration data comprises a set of encrypted keys, the set of encrypted keys corresponding to a set of encrypted keys previously stored by the failed active datacenter.

15. The non-transitory computer-readable storage medium of claim 9, wherein the user device transmits the active data to the failover system each time the user device reconnects with the active datacenter, and each time the user device updates its status.

16. The non-transitory computer-readable storage medium of claim 15, wherein the status of the user device comprises at least one of accepting a new pick-up request, completing a current trip, updating a waypoint, initiating the application, or terminating the application.

17. A computer-implemented method for restoring data in a datacenter failover, the method performed by one or more processors of a failover system and a user device and comprising:

transmitting, by the user device running an application specific to a service entity that provides an application service using an active datacenter, active data to the failover system, the active data indicating a current status of the user device;

identifying, by the failover system, a first portion of the active data associated with a service state change of the user device, and a second portion of the active data associated with a device ping of the user device;

transmitting, by the failover system, an instruction to the user device to store first restoration data associated with the second portion of the active data; and storing, by the user device, the first restoration data;

receiving, by the user device, a request from the failover system for the first restoration data due to a failover event indicating a failure of the active datacenter; and transmitting, by the user device, the first restoration data to the failover system based on the request, wherein the first restoration data is stored in a backup datacenter of the active datacenter.

18. The computer-implemented method of claim 17, further comprising:

storing, by the failover system, second restoration data associated with the first portion of the active data at a backup datacenter of the active datacenter.

19. The computer-implemented method of claim 18, further comprising:

identifying, by the failover system, a failover event indicating a failure of the active data center;

retrieving the first restoration data from the user device responsive to identifying the failover event; and providing, by the failover system, the retrieved first restoration data to the backup datacenter for storage.

20. The computer-implemented method of claim 17, wherein the first restoration data stored at the user device comprises a set of encrypted keys, the set of encrypted keys corresponding to a set of encrypted keys previously stored by the failed active datacenter.

* * * * *